(12) United States Patent
Read

(10) Patent No.: US 12,215,786 B2
(45) Date of Patent: Feb. 4, 2025

(54) ORBITAL TENSILE DRIVE

(71) Applicant: Massachusetts Institute of Technology, Cambridge, MA (US)

(72) Inventor: Jake Robert Read, Mississauga (CA)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 18/474,841

(22) Filed: Sep. 26, 2023

(65) Prior Publication Data
US 2024/0110614 A1    Apr. 4, 2024

Related U.S. Application Data

(60) Provisional application No. 63/377,081, filed on Sep. 26, 2022.

(51) Int. Cl.
| | |
|---|---|
| *F16H 7/20* | (2006.01) |
| *F16H 7/00* | (2006.01) |
| *F16H 57/00* | (2012.01) |
| *F16H 57/035* | (2012.01) |

(52) U.S. Cl.
CPC ........... *F16H 7/20* (2013.01); *F16H 57/0025* (2013.01); *F16H 57/035* (2013.01)

(58) Field of Classification Search
CPC ...... F16H 57/08; F16H 57/20; F16H 57/0025; F16H 57/035; F16H 57/082; F16H 7/00; F16H 55/0833; F16H 9/26; Y10T 74/137; H02K 7/1163; B25J 9/102
See application file for complete search history.

(56) References Cited

U.S. PATENT DOCUMENTS

| | | | | |
|---|---|---|---|---|
| 2,559,299 | A * | 7/1951 | Helling | F16H 7/00 |
| | | | | 475/182 |
| 4,896,566 | A * | 1/1990 | Salesse | B25J 9/1045 |
| | | | | 475/182 |
| 5,033,995 | A * | 7/1991 | Salesse | B25J 9/1045 |
| | | | | 475/182 |
| 9,441,712 | B1 * | 9/2016 | Tjensvoll | F03D 15/00 |
| 2021/0131535 | A1 * | 5/2021 | Konya | F16G 1/28 |
| 2023/0364809 | A1 * | 11/2023 | Delaporte | B25J 19/02 |

FOREIGN PATENT DOCUMENTS

| | | | | |
|---|---|---|---|---|
| DE | | 3918348 A1 * | 12/1990 | |
| GB | | 632380 A * | 11/1949 | F16H 7/00 |

\* cited by examiner

*Primary Examiner* — Michael R Mansen
*Assistant Examiner* — Katelynne R Burrell
(74) *Attorney, Agent, or Firm* — Dunlap Bennett & Ludwig, PLLC

(57) ABSTRACT

An orbital tensile drive is herein disclosed, along with systems and methods associated therewith. The orbital tensile drive uses a tensile element that is conveyed around a static, fixed shaft and a rotating output shaft. This is facilitated via multiple orbiting idler pulleys that are mounted to an orbiter body. The static and rotating shafts, as well as the orbiting assembly, share a common axis. Input rotation to the orbiter body is transformed into lower-speed, higher-torque rotation at the rotating output shaft. The present invention has many potential applications including, but not limited to, robotics.

20 Claims, 15 Drawing Sheets

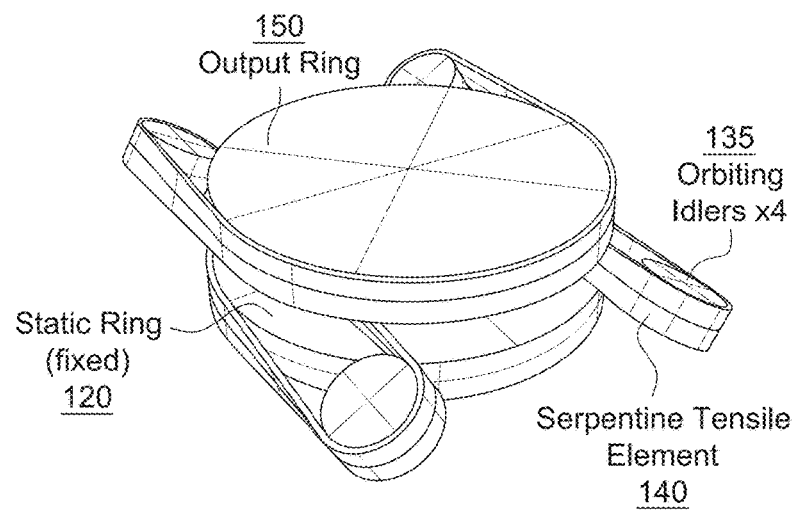
FIG. 12
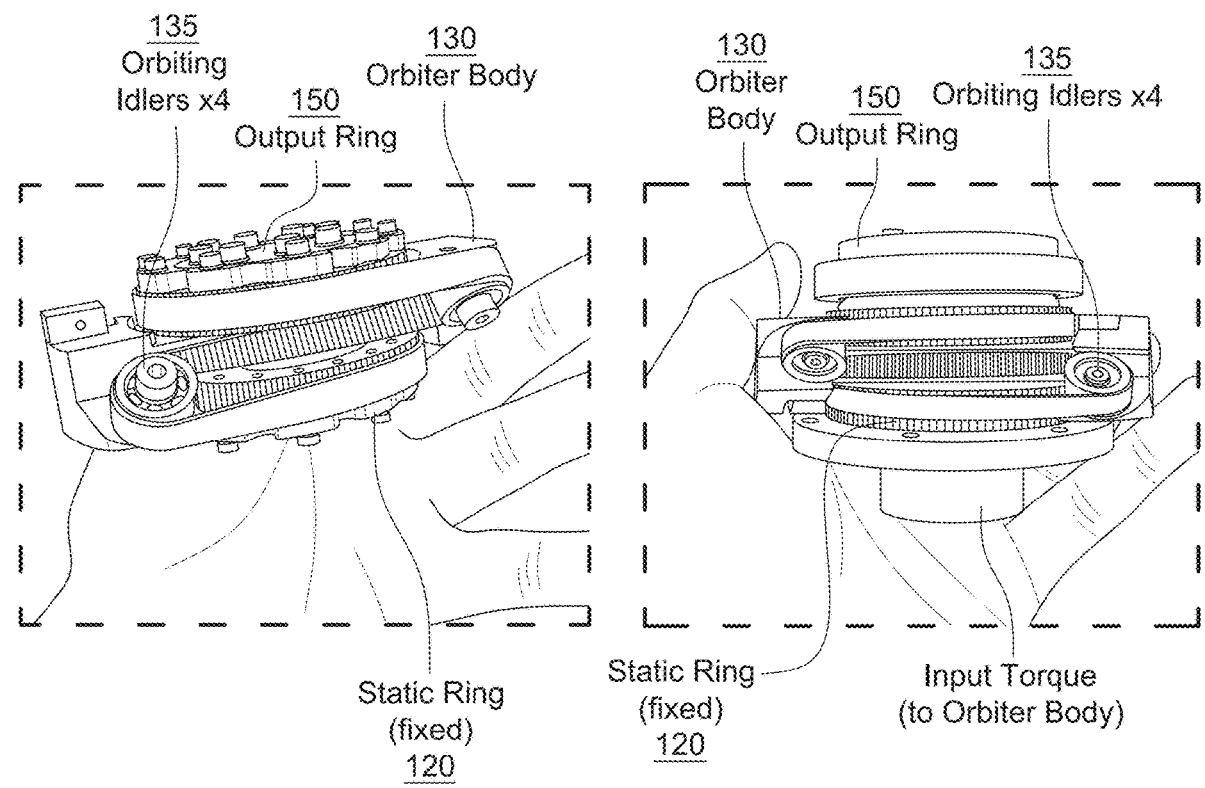
FIG. 13A
FIG. 13B

ORBITAL TENSILE DRIVE

CROSS-REFERENCE TO RELATED APPLICATIONS

The present application claims the benefit of U.S. Provisional Patent Application No. 63/377,081 entitled "ORBITAL TENSILE DRIVE", filed on Sep. 26, 2022. The entire contents of the above-listed application are hereby incorporated by reference for all purposes.

FIELD

The present invention relates to transmissions and, more particularly, to an orbital tensile drive for transforming a high-speed, low-torque rotation input into a lower-speed, higher-torque rotation output.

BACKGROUND

Transmissions, also known as reductions, gearboxes or speed reducers, that transform high-speed, low-torque inputs (typically, but not always, from electronic motors) into low-speed, high-torque outputs are common almost anywhere rotary motion needs to be controlled by a computer system or other controller. This transformation is often needed for the input to be able to operate within the speed-torque requirements of a particular application and the input. Commonly used systems include strain wave (also known as "harmonic") drives, cycloidal gearboxes, spur gearboxes, planetary gearboxes, timing belts, and cable drives.

The most prominent application of this is in robotics and automation, but these types of transmissions are also used in, e.g., avionics and other industrial equipment. For example, industrial robot arms frequently contain six such reductions, one at each joint, between the joint's motor and the joint's physical output.

These applications often require that reductions be packaged into small and lightweight form factors, and that they provide a high quality of motion (synonymous with the "smoothness" of motion). Where traditional gear-teeth are used, such smoothness requires high precision manufacturing, and high hardness materials, resulting in high production costs.

Harmonic drives can be used in high-performance systems where high gear reduction ratios (e.g., greater than 30:1) and little to no backlash are required. Harmonic drives, however, have many pitfalls. For example, they are expensive to employ within a system.

Other systems that use tensile elements do not require this precision or material hardness. For example, a belt's rubber interface naturally takes up any slop in imprecise geometry, e.g., flat or round tensile elements do not require precise interfaces, and the tension pre-loads systems to eliminate "rattle". This means that belt-based systems can often be manufactured with injection-molded parts, or lower precision machining. Large-ratio belt reductions, however, are normally physically large or require complex multi-stage designs that have challenging belt management and large pre-load forces.

As can be seen, there is a need for an orbital tensile drive that is, among other things, compact, effective, and low-cost to produce.

SUMMARY

In one aspect of the present disclosure, an orbital tensile drive includes a fixed shaft, an output shaft, an orbiter body, and a tensile element. The fixed shaft, output shaft, and orbiter body are coaxial with one another, and the orbiter body is sandwiched between the fixed shaft and the output shaft. The tensile element is movably engaged with the fixed shaft, the output shaft, and the orbiter body. In use, the orbiter body is operative to rotate, which causes (1) relative rotation between the fixed shaft and the output shaft, and (2) relative rotation between the orbiter body and the output shaft.

In another aspect of the present disclosure, an orbital tensile drive includes a fixed shaft, an output shaft, and an orbiter body, and a tensile element. The orbiter body includes multiple idler pulleys. Further, the tensile element is movably engaged with the fixed shaft, the output shaft, and the idler pulleys. In use, the orbiter body is operative to rotate, which causes: (1) relative rotation between the fixed shaft and the output shaft, and (2) relative rotation between the orbiter body and the output shaft.

These and other features, aspects and advantages of the present disclosure will become better understood with reference to the following drawings, descriptions, and claims.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure. The figures are not necessarily shown to scale relative to each other.

FIG. 12 is a diagrammatic view of a fixed shaft, an output shaft, idler pulleys, and a tensile element of the orbital tensile drive, according to aspects of the present disclosure;

FIGS. 13(a) and 13(b) are pictures of the orbital tensile drive, formed via different processes but with the same end utility, according to aspects of the present disclosure;

DETAILED DESCRIPTION

Figure 1:
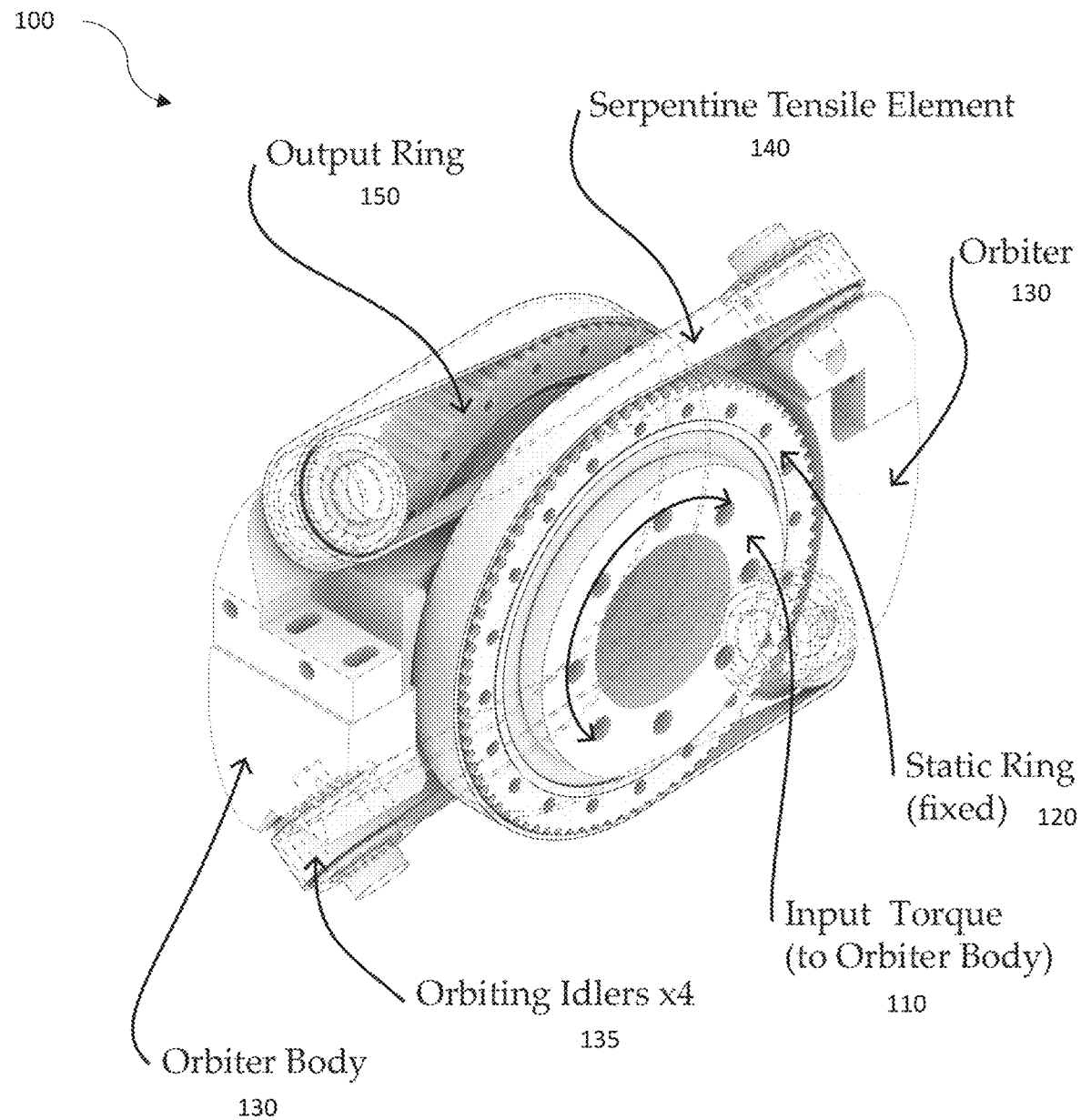
FIG. 1 is a front perspective, schematic view of an orbital tensile drive, with an opposite side thereof and non-visible portions of idler pulleys depicted in phantom lines, according to aspects of the present disclosure.

The subject disclosure is described with reference to the figures, wherein like reference numerals are used to refer to like elements throughout. In the following description, for purposes of explanation, numerous specific details are set forth in order to provide a thorough understanding of the present disclosure such that one skilled in the art will be enabled to make and use the present invention. It may be evident, however, that the present disclosure may be practiced without some of these specific details. For the purpose of clarity, technical material that is known in the technical fields related to the present disclosure has not been described in detail so that the present disclosure is not unnecessarily obscured.

To address the drawbacks described above, the present disclosure includes a novel arrangement of a tensile element and idlers that is non-intuitively driven by rotating the idlers. The arrangement successfully integrates a high-reduction tensile element drive into a small form factor, making low-cost, high-quality motion possible where other belt drives simply do not fit. Broadly, one embodiment of the present disclosure is an orbital tensile drive that uses a tensile element conveyed around a static, fixed shaft and a rotating output shaft using a plurality of orbiting idler pulleys mounted to an orbiter body. The static and rotating shafts, as well as the orbiting assembly, share a common axis. Input rotation to the orbiter body is transformed into lower-speed, higher-torque rotation at the rotating output shaft.

As stated above, the present disclosure includes, among other things, a novel arrangement of a tensile element and idler pulleys, the tensile element being non-intuitively driven by rotating the idler pulleys. The resultant device functions as a high-reduction belt drive with a very compact form factor. Embodiments of the present invention do not require high-precision manufacturing, nor do they require hardened materials or gear lube for reliable operation. By using a flexible tensile element rather than rigid teeth, larger tolerances can be utilized in full-scale manufacturing.

Figure 5:
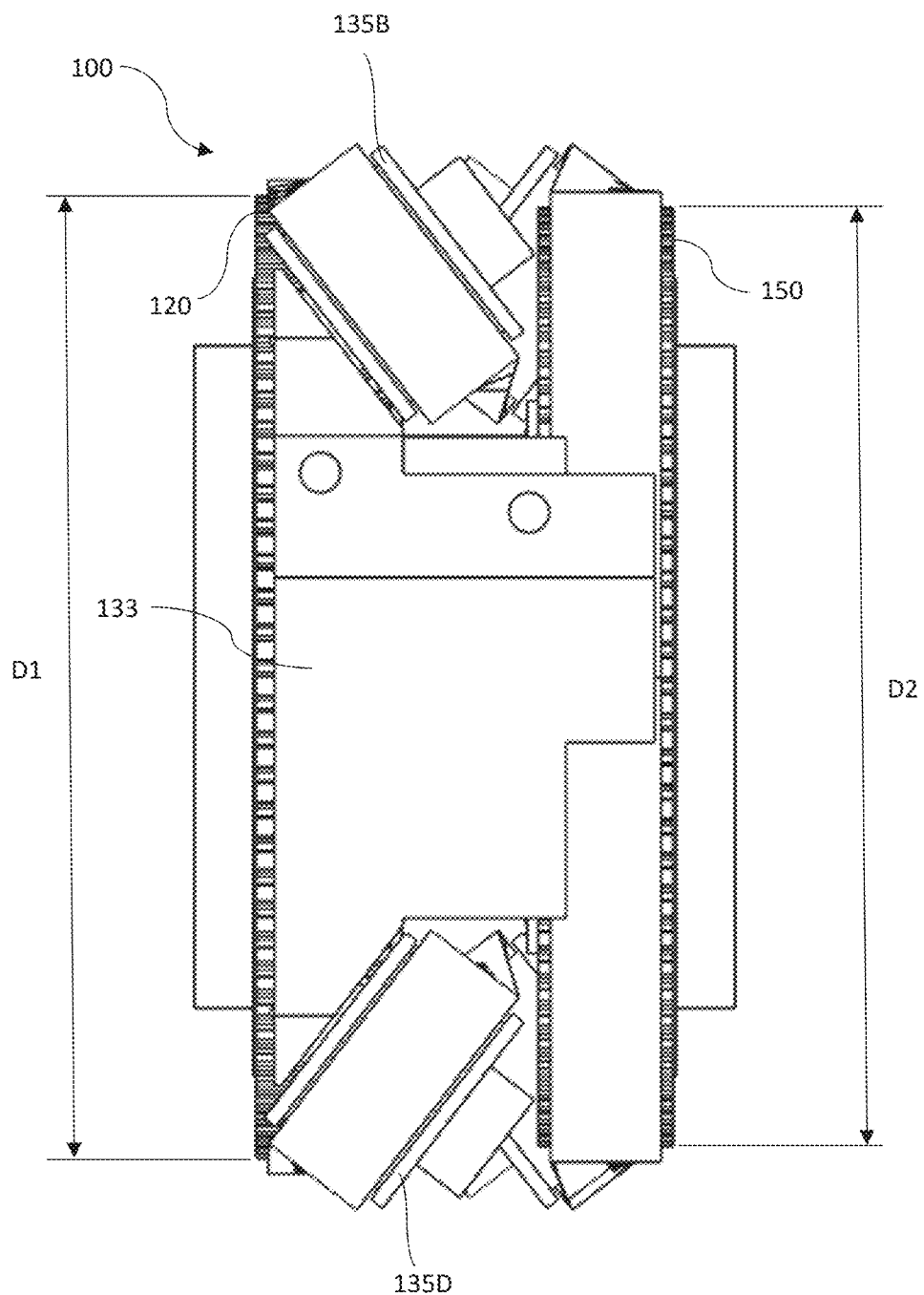
FIG. 5 is a right-side elevation view of the orbital tensile drive, according to aspects of the present disclosure.
Figure 6:
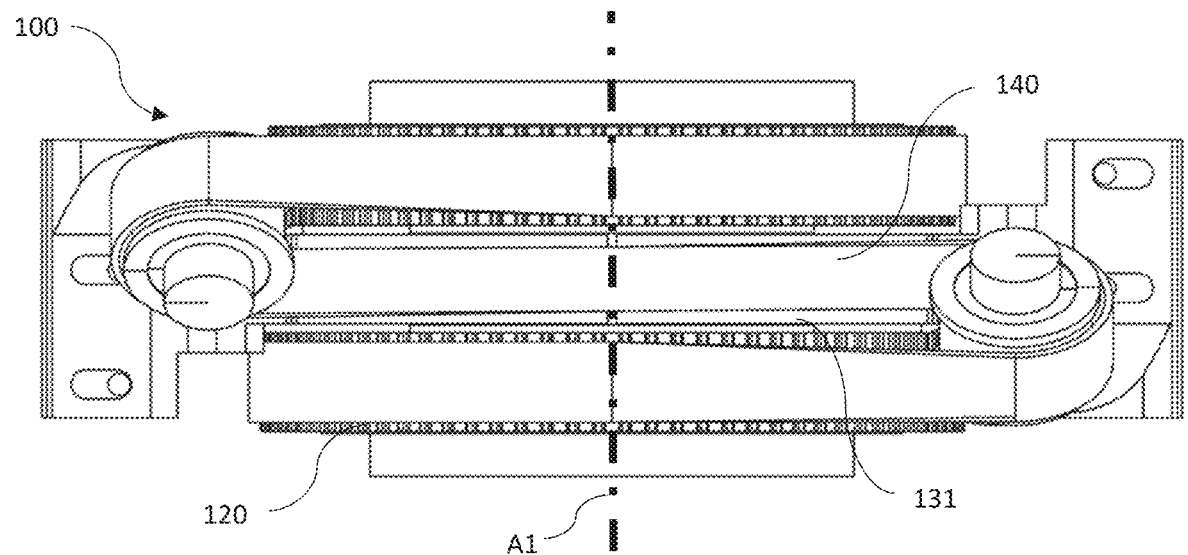
FIG. 6 is a top-plan view of the orbital tensile drive, according to aspects of the present disclosure.
Figure 7:
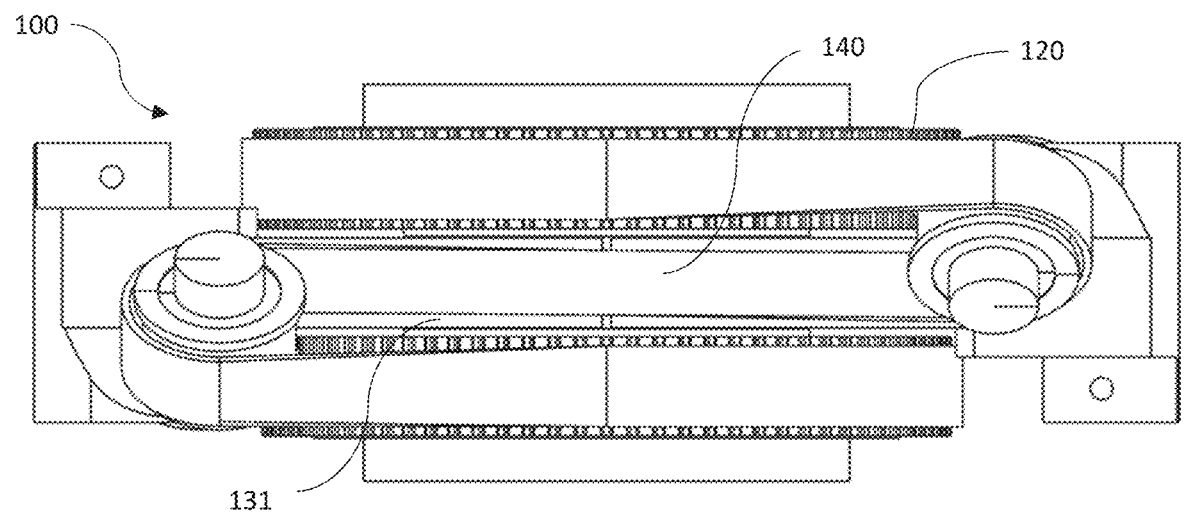
FIG. 7 is a bottom-plan view of the orbital tensile drive, according to aspects of the present disclosure.

Referring now to FIGS. 1-16, an orbital tensile drive 100 generally includes an input shaft 110, a static, fixed shaft 120, an orbiter body 130, a tensile element 140, and a rotatable, output shaft 150. In certain embodiments, the input shaft 110, the fixed shaft 120, and/or the output shaft 150 may be formed as hollow shafts to define a ring shape. These components are operatively connected to one another to transform high-speed, low-torque rotation of the input shaft 110 into reduced speed, higher-torque rotation of the output shaft 150. The input shaft 110, orbiter body 130, and output shaft 150 share a common axis (i.e., are coaxial with one another) and are rotatable axis A1, as shown in FIG. 6. As illustrated in FIG. 5, the fixed shaft 120 has an outer diameter D1, and the output shaft 150 has an outer diameter D2.

Figure 14:
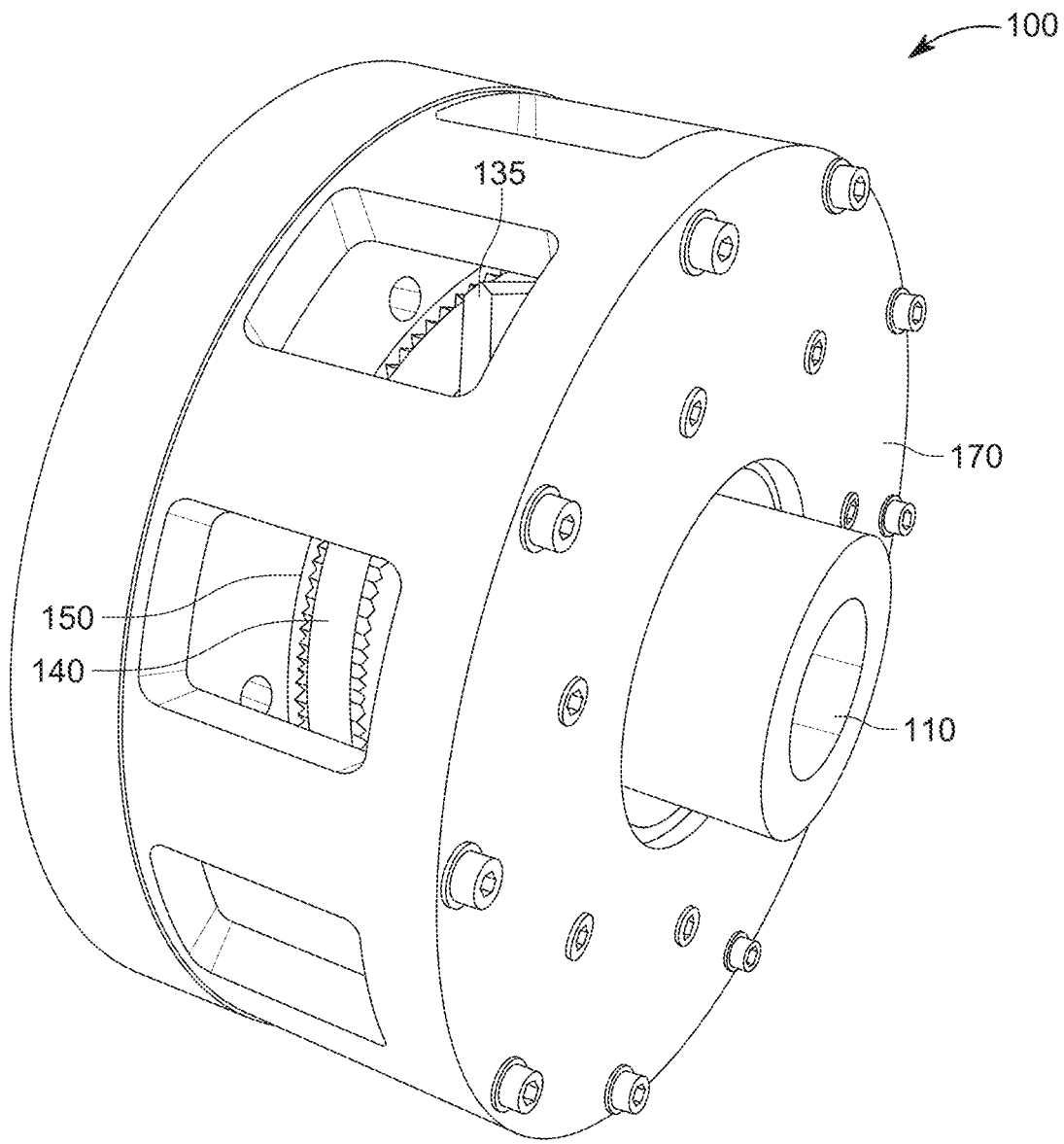
FIG. 14 is a picture of the orbital tensile drive, depicted mounted in a housing, according to aspects of the present disclosure.

Turning now to FIGS. 2, 10, 11, and 14, the input shaft 110 nests within and extends through the fixed shaft 120. As further depicted in FIG. 11, the input shaft 110 can include a first inner rotational member 111 that rotatably engages a bearing 160 to rotatably mount the input shaft 110 to the fixed shaft 120. An outer portion of the input shaft 110 (right side of the input shaft 110 shown in FIG. 11) is configured to engage an input 200 via a coupling 201, which is explained in greater detail below with reference to FIGS. 15 and 16. The fixed shaft 120 can be held in place in any appropriate manner. By way of example, and as shown in FIG. 14, the fixed shaft 120 can be securely mounted to a housing 170, which can be designed to contain the orbiter body 130 and output shaft 150.

Figure 2:
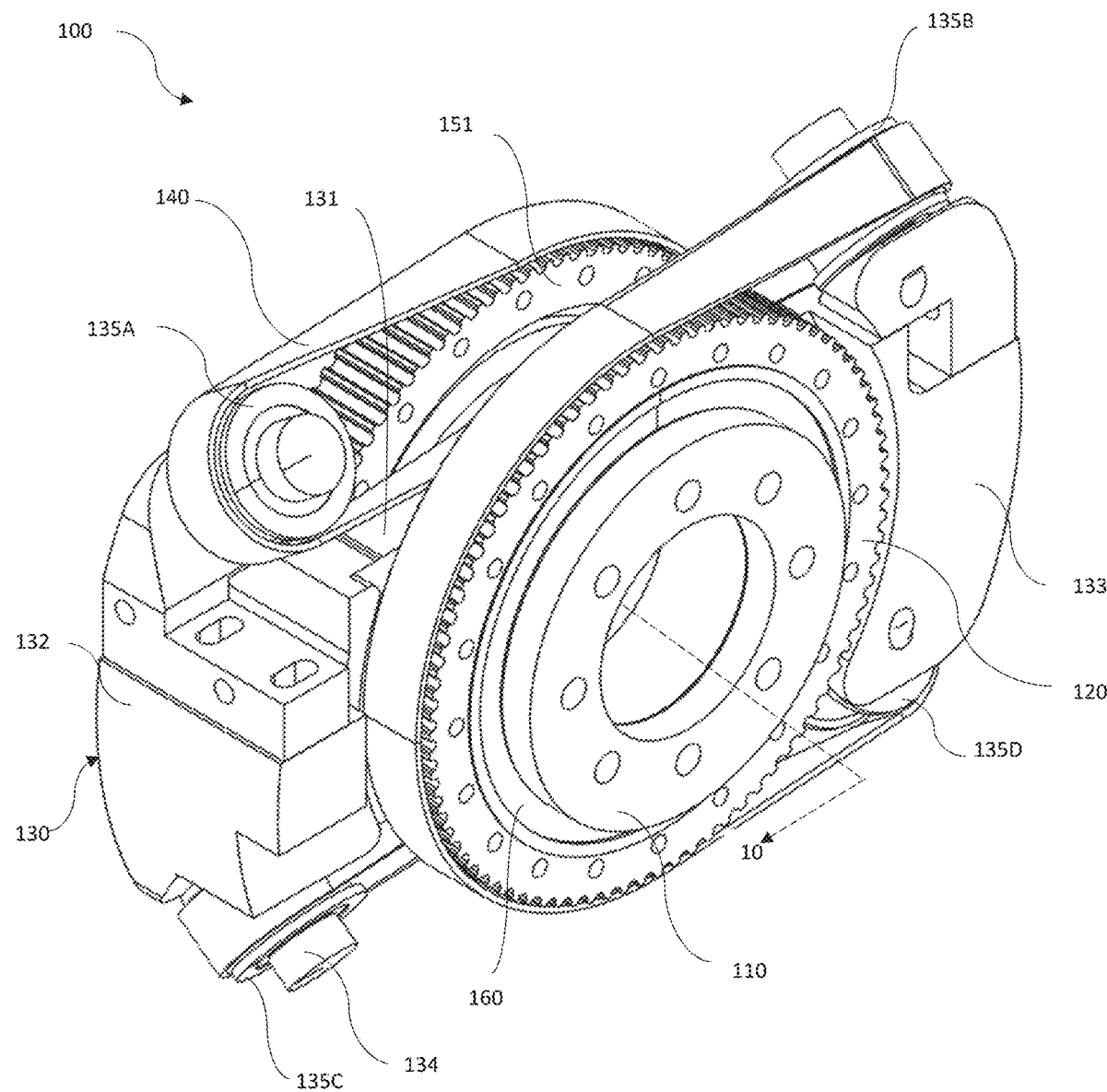
FIG. 2 is a front, top perspective view of the orbital tensile drive, according to aspects of the present disclosure.
Figure 10:
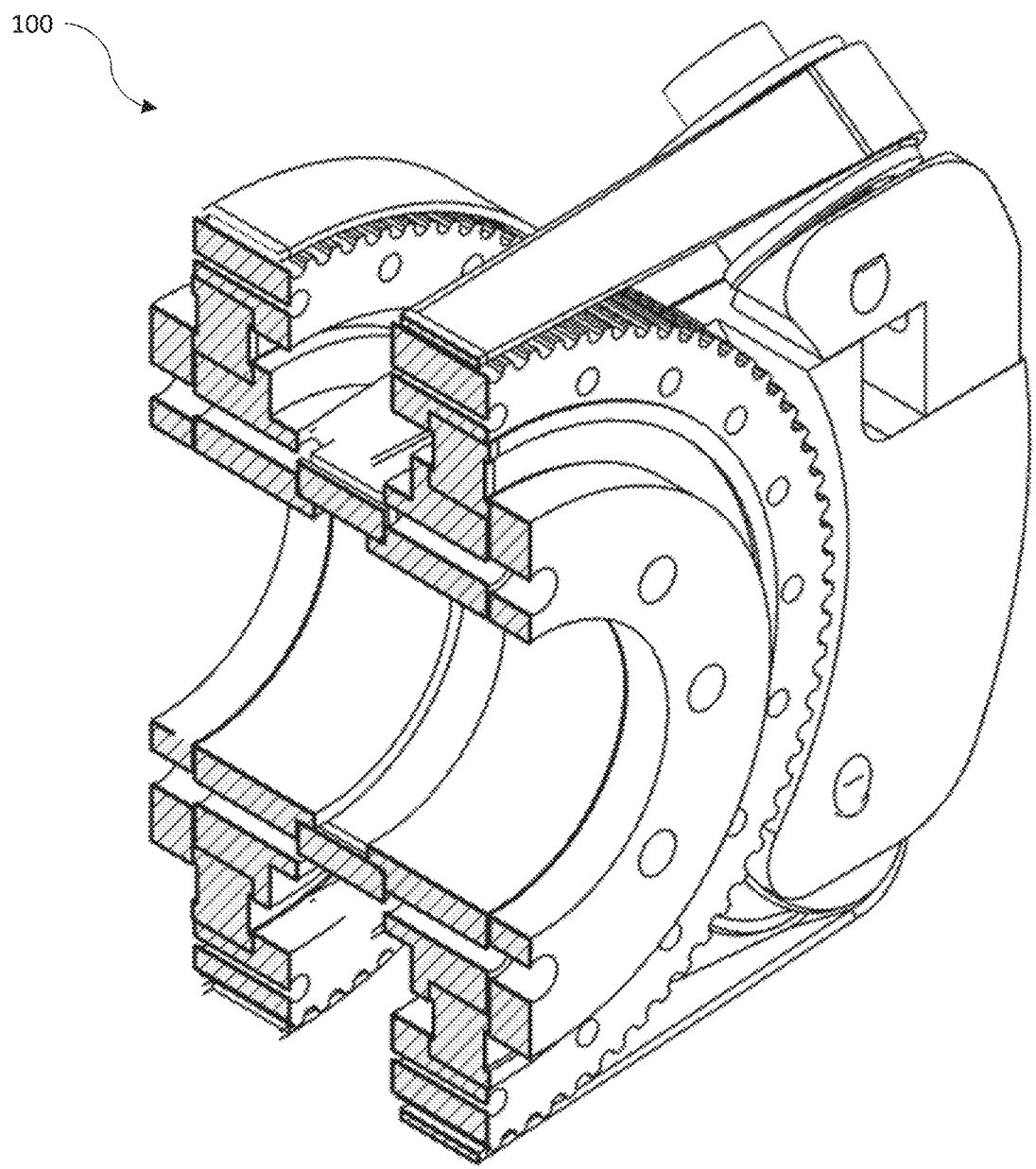
FIG. 10 is a cross-sectional view of the orbital tensile drive, cut relative to line 10-10 in FIG. 2, according to aspects of the present disclosure.
Figure 11:
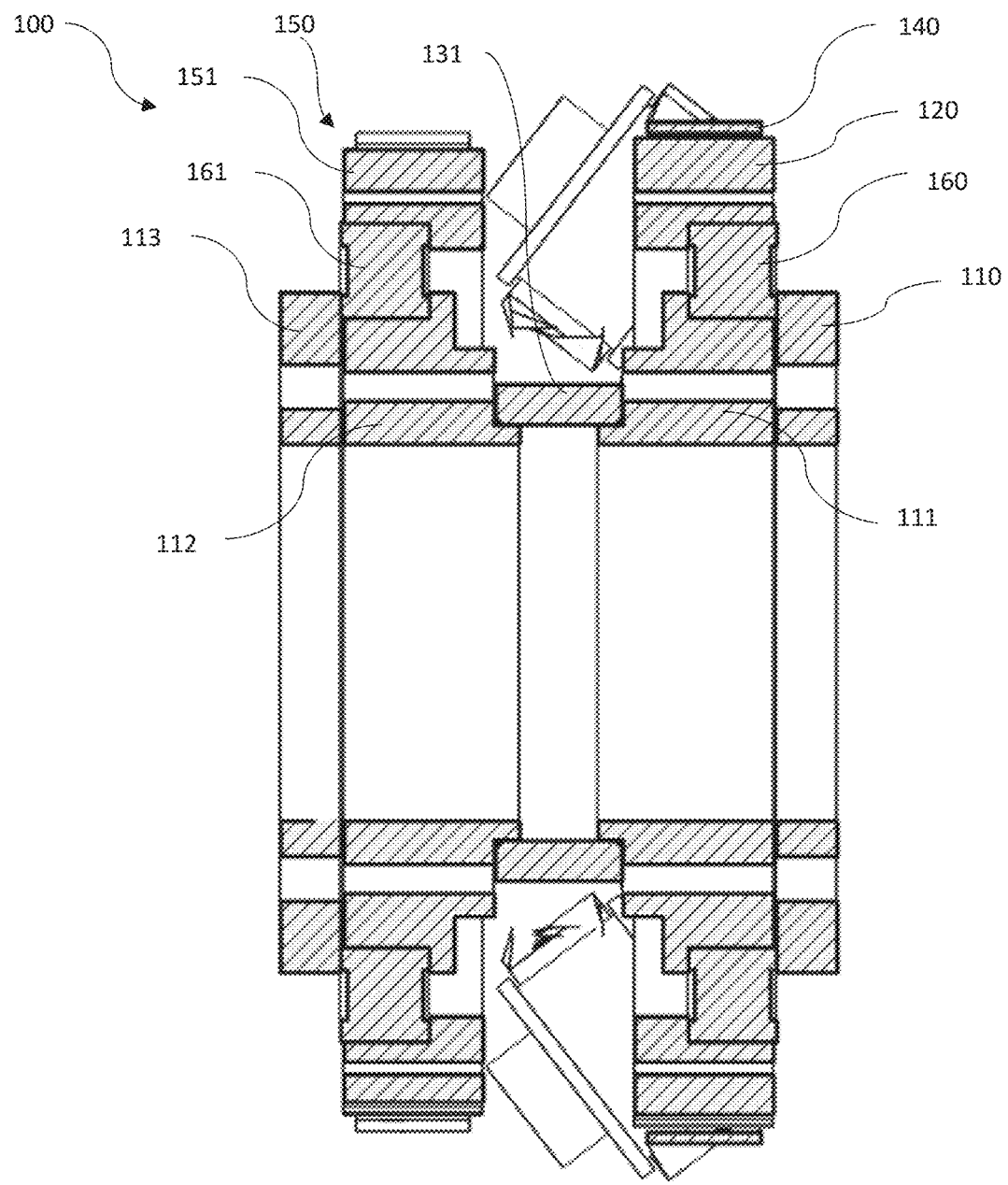
FIG. 11 is a left side elevation view of the cross-sectional cut shown in FIG. 10, according to aspects of the present disclosure.

Again, making reference to FIGS. 2, 10, and 11, the orbiter body 130 may include a centrally disposed orbiter main member 131 and two laterally disposed orbiter side members 132, 133. The orbiter main member 131 is sandwiched between the input shaft 110 (and the fixed shaft 120) and the output shaft 150 along the main rotational axis A1. As seen in FIGS. 10 and 11, a small annular ledge may be defined on an inner portion of the first inner rotational member 111 that the orbiter main member 131 is fixedly coupled to. Those with skill in the art will appreciate that any appropriate connection type may be utilized and, in certain embodiments, the input shaft 110 may be made integral with the first inner rotational member 111.

Further, as also seen in FIGS. 10 and 11, a second inner rotational member 112 may be fixedly coupled to or integral with a side of the orbiter main member 131 opposite the first inner rotational member 111. An outer plate 113 may be coupled to or integral with the second inner rotational member 112. A second bearing 161 is engaged with the second inner rotational member 112 to allow it to spin freely relative to the output shaft 150 (which encircles the second inner rotational member 112) when the orbiter body 130 is rotated with the input shaft 110.

Figure 8:
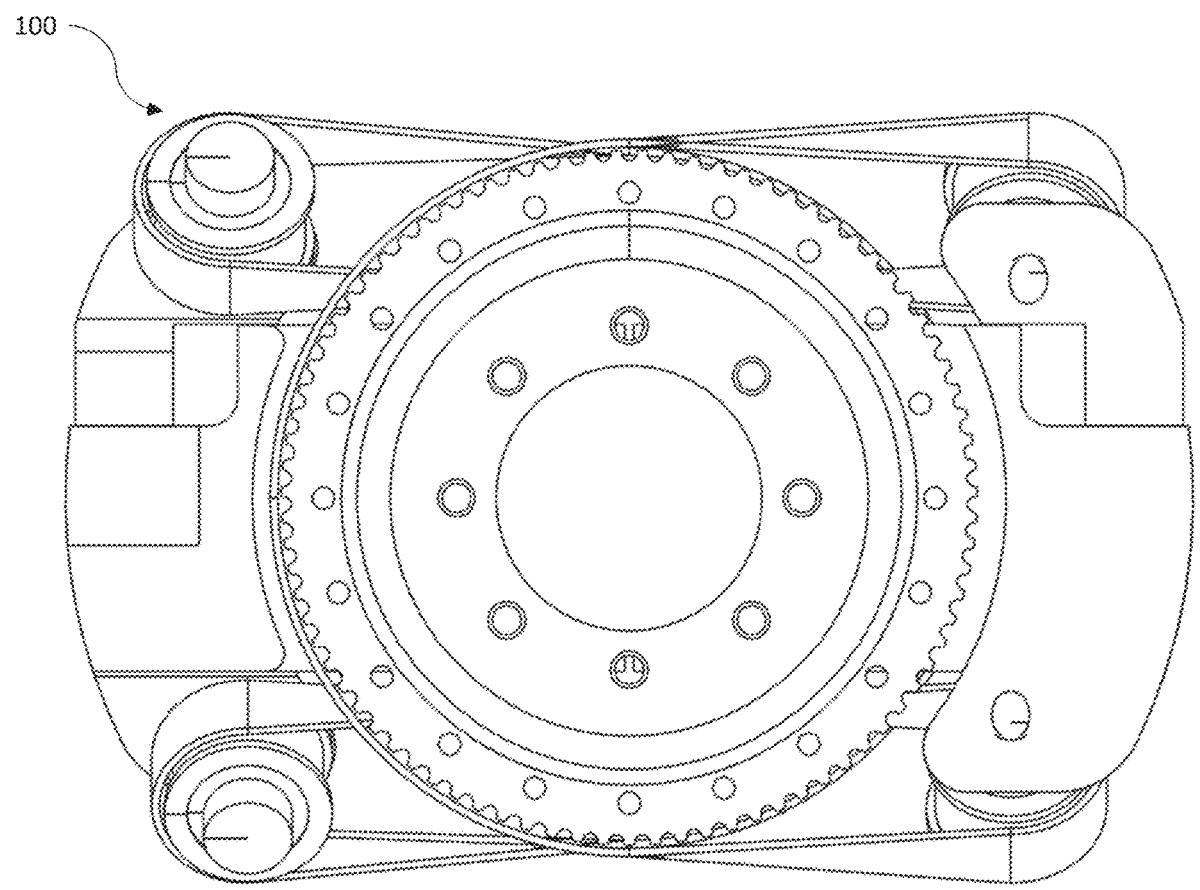
FIG. 8 is a front-elevation view of the orbital tensile drive, according to aspects of the present disclosure.
Figure 9:
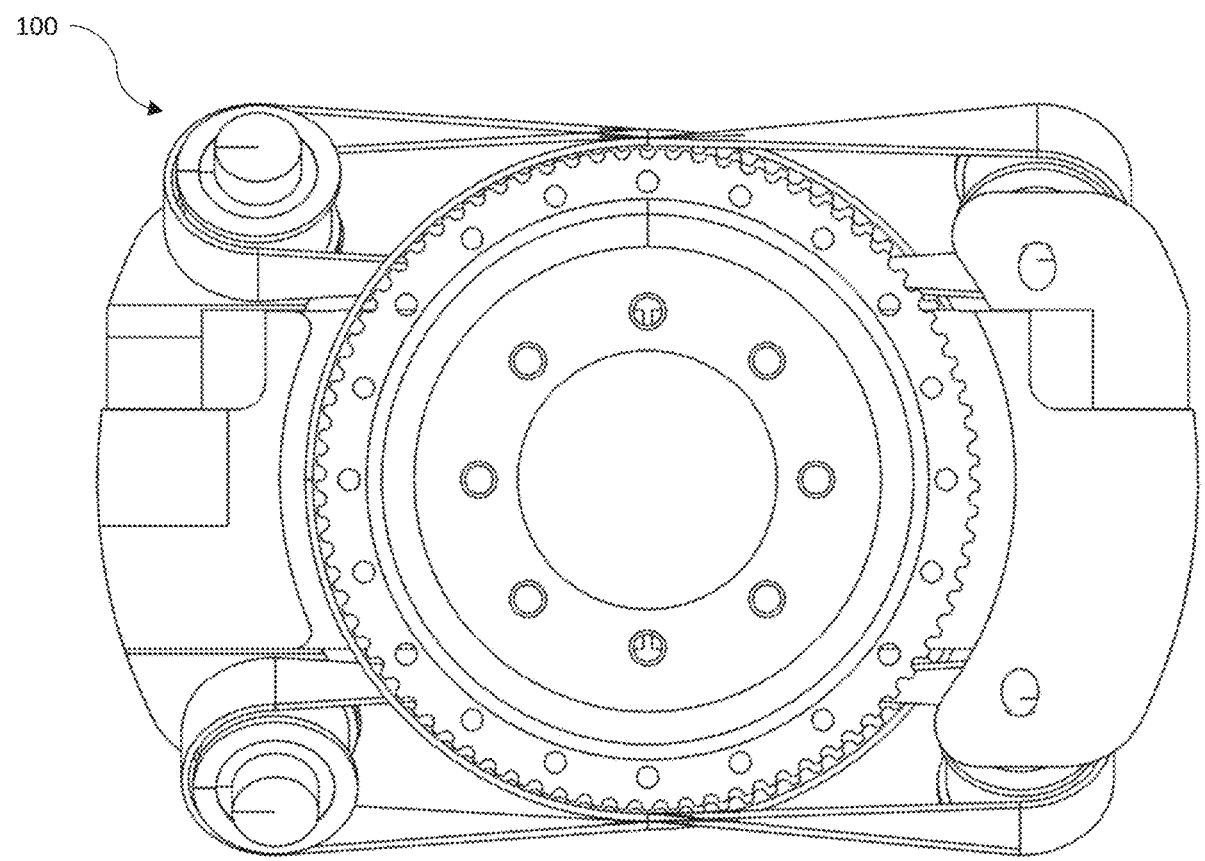
FIG. 9 is a rear-elevation view of the orbital tensile drive, according to aspects of the present disclosure.

As shown in FIGS. 2, 8 and 9, the laterally disposed orbiter side members 132, 133 each extend beyond the outer diameters D1, D2 (and, therefore, circumferences) of the fixed shaft 120 and output shaft 150, respectively. When the input shaft 110 is rotated, the orbiter side members 132, 133 "orbit" the fixed shaft 120 and output shaft 150 due to the connection between the orbiter main member 131 and the first inner rotational member 111.

The first orbiter side member 132 and the second orbiter side member 133 each include a pair of pivot pins 134 angularly extending therefrom. As denoted in FIG. 4, both the pivot pins 134 on the first orbiter side member 132 extend away from the main rotational axis A1 at an angle θ and towards the fixed shaft 120. In a similar manner, and as shown in FIG. 5, the pivot pins 134 on the second orbiter side member also extend away from the main rotational axis A1 at an angle θ, but they extend towards the output shaft 150. These angles θ are specific to the layout of the idler pulleys 135 (described in greater detail below). The angles θ are designed to minimize the twist in the tensile element 140. In the illustrated embodiment of FIGS. 1-16, the pivot pins 134 are angled such that the centerline of the tensile element 140, which travels between those idler pulleys 135, is exactly perpendicular to the drive's main axis. As those with skill in the art will appreciate, the exact angle varies slightly as idler diameters and positions change, as depicted in the embodiments of FIGS. 17-20.

Rotatably mounted to each of these pivot pins 134 are respective idler pulleys 135. In the illustrated embodiment of FIGS. 1-16, there are four pivot pins 134 and tour corresponding idler pulleys: a first idler pulley 135A, a second idler pulley 135B, a third idler pulley 1350, and a fourth idler pulley 135D. However, other pulley arrangements are envisaged and within the spirit and scope of the present disclosure, for example, as illustrated in FIGS. 17-20. Referring to FIGS. 4-7, the first side member 132 is formed in such a way that, due to their angled orientation, the first pulley 135A and the third pulley 135 partially overlap with the output gear 150 (e.g., FIGS. 4 and 6-7) relative to the main rotational axis A1. Likewise, the second side member 133 is formed so that, due to their angled orientation, the second pulley 135B and the fourth pulley 135D partially overlap with the output gear 150 (e.g., FIGS. 5-7) relative to the main rotational axis A1.

Wrapped around the idler pulleys 135A-D is an endless tensile element 140. While it is depicted as a belt in the figures, those with skill in the art will appreciate that it may take various forms, such as, but not limited to, a timing belt, flat belt, v-belt, or any rope, chain, or cable. Depending upon application, different tensile elements 140 may prove more suitable than others. For example, flat belts may be particularly advantageous in robotics due to their high efficiency, whereas chains may be useful in heavy machinery, where tensile forces are high. It is also possible to use simple wire rope or, e.g., performance aramid fibers like SPECTRA™, but those would require their manufacture into seamless endless loops.

In certain embodiments where the tensile element 140 is, for example, a timing belt, the fixed shaft 120 and output shaft 150 can be provided with teeth, for example, as illustrated in FIGS. 2, 13(a) and 13(b), to engage teeth of the timing belt. Depending on the type of tensile element 140 used, it can either mesh with or frictionally engage with an outer surface of the fixed shaft 120 and an outer surface of the output shaft 150. Based on the type of engagement between the tensile element 140 and the shafts 120, 150, rotary sensors can be positioned on the respective shafts 120, 150 to pick up on slip. Further, the amount that the tensile element 140 stretches can also be measured to determine how much load the drive is exerting. For example, if more load is being exerted than what is designed for, there is something wrong with the system and operation of the orbital tensile drive 100 can be stopped. By way of example, in certain embodiments, stretch in the tensile element 140 may be employed as an elastic element as described in U.S. Pat. No. 5,650,704, the disclosure of which is herein incorporated by reference. The measured stretch may then be used as a measurement that is analogous to a torque reading.

Figure 3:
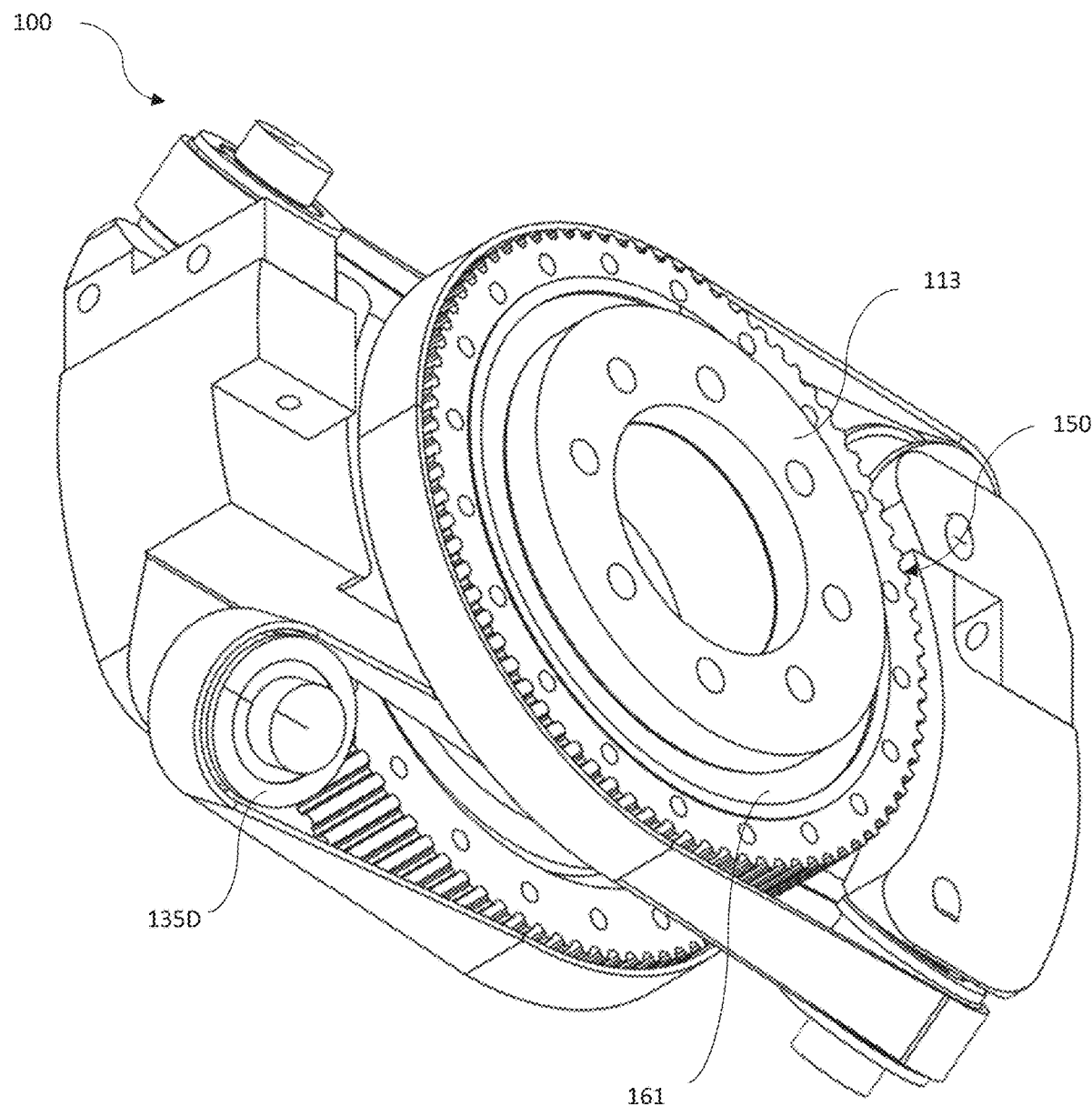
FIG. 3 is a rear, bottom perspective view of the orbital tensile drive, according to aspects of the present disclosure.
Figure 4:
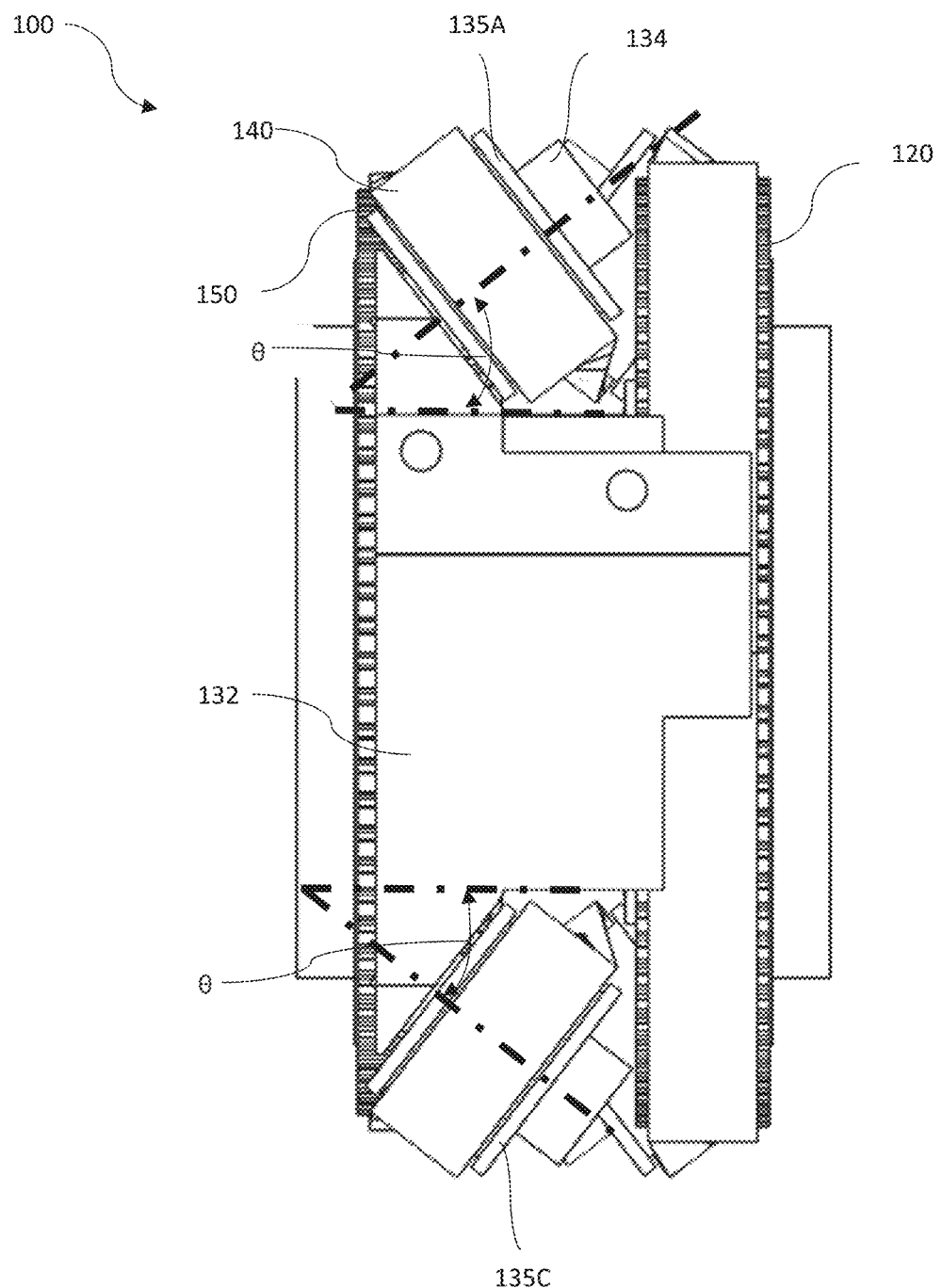
FIG. 4 is a left-side elevation view of the orbital tensile drive, according to aspects of the present disclosure.

With further reference to FIGS. 3, 10, and 11, the output shaft 150 is provided on an outer portion of the second bearing 161. Like the fixed shaft 120, the output shaft 150 may be positioned in any appropriate manner. By way of example, and as shown in FIG. 14, the output shaft 150 can be rotatably mounted within a housing 170. The output shaft 150 is not physically coupled to the input shaft 110, the fixed shaft 120, or the orbiter body 130 except via the tensile element 140, which engages an outer surface of the output shaft 150. An outer portion 151 of the output shaft 150 can couple to any variety of driven members, such as an arm 300 shown in FIGS. 15 and 16.

The tensile element 140 is the component that transmits forces between the output shaft 150 and the fixed shaft 120 and is looped about the components in the following manner. Arbitrarily starting at the first idler pulley 135A (for the purposes of explanation), the tensile element 140 partially wraps around the output shaft 150, as shown, for example, in FIGS. 2 and 3, such that it is redirected to extend and partially wrap around the third idler pulley 135C. The tensile element 140 is redirected by the third idler pulley 135C and runs along a lower surface of the orbiter main member 13, as shown, for example, in FIG. 7. As seen in FIGS. 2 and 3, the tensile element 140 is then redirected by the fourth idler pulley 135D to partially wrap around the fixed shaft 120. Finally, the tensile element 140 is redirected around the second idler pulley 135B to run along an upper surface of the orbiter main member 131, as illustrated, for example, in FIG. 6, and terminating at the first idler pulley 135A, thus forming an endless loop. As shown in the figures, the inclined angle of the idler pulleys 135A-D and their respective overlaps with the fixed shaft 120 and the output shaft 150 help to ensure and maintain proper positioning of the tensile element 140 around those shafts 120, 150 as the orbiter body 130 rotates.

The orbiter body 130, in conjunction with the plurality of pulleys 135A-D and tensile element 140, enables the high reduction in rotation speed between the input shaft 110 and the output shaft 150 in such a small form factor. Because the output shaft 150 is otherwise not physically coupled to the other components of the orbital tensile drive 100, the tensile element 140 is the only component that transmits torque to the output shaft 150. In use, when the input shaft 110 is turned, the rotation causes the orbiter body 130 to move in unison therewith, with the orbiter side members 132, 133 orbiting the rest of the orbital tensile drive 100, as mentioned above. Because the tensile element 140 is either frictionally engaged or meshed with the fixed shaft 120 and the output shaft 150, the tensile element 140 continuously partially winds around the circumferences of both (in the same rotational direction), causing the tensile element 140 to be pulled along such that the idler pulleys 135A-D are urged to rotate (to prevent the tensile element 140, and thus the entire orbiter body 130, from becoming jammed).

The torque that is transmitted to the output shaft 150 is due to a relative difference in diameter size between the outer diameter D1 of the fixed shaft 120 and the outer diameter D2 of the output shaft 150. The reduction ratio is described by the following equation:

$$\text{Reduction Ratio} = \frac{\text{Output Diameter } D2 - \text{Static Diameter } D1}{\text{Output Diameter } D2}$$

More specifically, for every rotation of the orbiter body 130, one static shaft 120 circumference's worth of length of the tensile element 140 is wound onto the static shaft 120. Because the tensile element 140 is endless, what is wound onto the static shaft 120 is correspondingly wound off of the output shaft 150. Since there is a net difference in the circumferences due to the differing diameter sizes, the output shaft 150 must rotate to account for the difference in these circumferences. In instances where the output shaft 150 is embodied with a smaller outer diameter D2 than the fixed shaft outer diameter D1, rotation of the output shaft 150 is in the opposite rotational direction relative to rotation of the input shaft 110. In instances where the output shaft 150 is embodied with a larger outer diameter D2 than the fixed shaft outer diameter D1, rotation of the output shaft 150 is in the same rotational direction as that of the input shaft 110. Per revolution of the input shaft 110 (and thus, also the orbiter body 130), the output shaft 150 will rotate that difference in circumference. Thus, because of the reduction ratio, the output shaft 150 rotates relative to (1) the fixed shaft 120 at a first relative rotation rate and (2) the orbiter body 130 and input shaft 110 at a second, different relative rotation rate.

In some embodiments, the difference in diameters may be made very small (e.g., the output diameter D2 is made slightly smaller than the static diameter D1), so that a full rotation of the orbiter body 130 translates into a small rotation of the output shaft 150, creating a large reduction. Because the difference in diameter can be made very small (arbitrarily small when, e.g., flat belts are used, but limited to a difference of one tooth's worth of pitch in, e.g., timing belts), the reduction ratio can be made large.

Equivalently, in the instances where gear teeth are used for the fixed shaft 120 and the output shaft 150 (in conjunction with, e.g., a timing belt as the tensile element 140), the reduction ratio is governed by the following equation:

$$\text{Reduction Ratio} = \frac{\text{Output Gear Teeth} - \text{Static Gear Teeth}}{\text{Output Gear Teeth}}$$

By way of example, suppose the output gear 150 has 98 teeth and the fixed gear 120 has 100 teeth. In such a scenario, one full revolution of the orbiter body 130 will result in the output gear 150 rotating the equivalent of the two teeth difference in the gears 120, 150.

Figure 15:
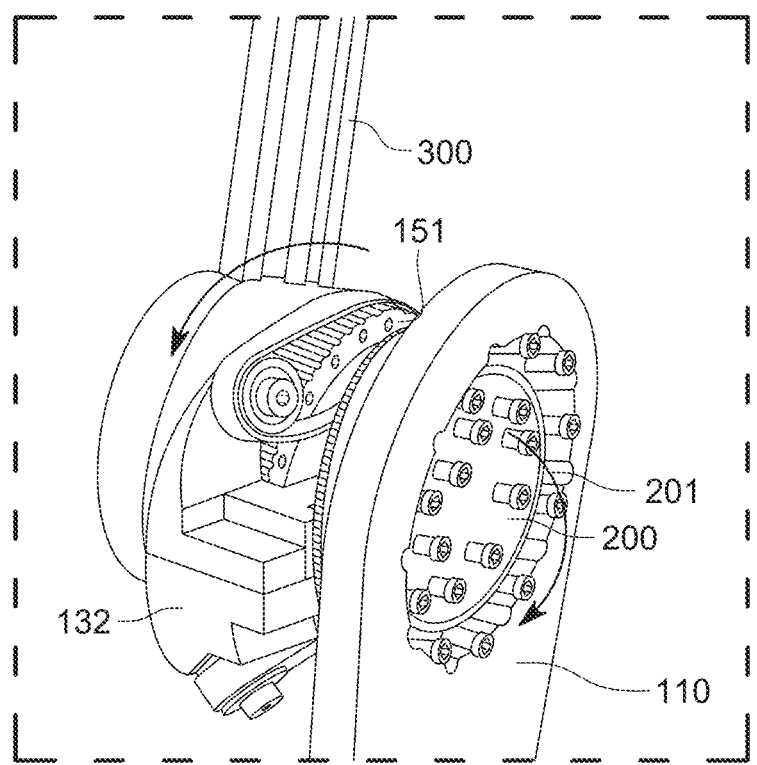
FIG. 15 is a picture of the orbital tensile drive, shown in use with a driven member in a first position, according to aspects of the present disclosure.
Figure 16:
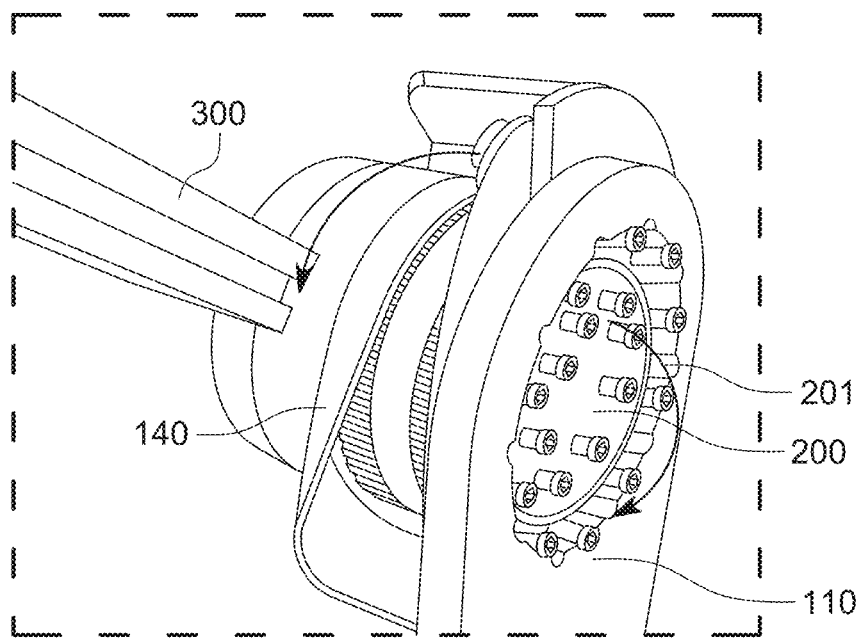
FIG. 16 is a picture of the orbital tensile drive, shown in use with the driven member in a second position, according to aspects of the present disclosure.

In use, as shown in FIGS. 15 and 16, the input shaft 110 operatively couples 201 with an input 200 (e.g., an electric motor) and the output shaft 150 couples with an arm 300. As denoted by the directional arrows, rotation of the input shaft 110 in a clockwise direction results in a counterclockwise rotation of the output shaft 150, causing the arm 300 to rotate therewith downwardly from the position shown in FIG. 15 to the position shown in FIG. 16. As discussed above, this is due to the output shaft 150 having a smaller outer diameter D2 than the fixed shaft outer diameter D1. Opposite, counterclockwise rotation of the input shaft 110, of course, results in the output shaft 150 rotating in the clockwise direction. Modifications to these outer diameter D1, D2 dimensions can alter the reduction ratio and even the direction of rotation of the output shaft 150.

Arrangements described herein are for exemplary purposes only. As such, those skilled in the art will appreciate that other arrangements and other elements (e.g., interfaces, machines, etc.) can be used in the alternative. Further, certain elements may be omitted altogether depending upon the desired results. As discussed above, many of the elements that are described are functional components that may be embodied as discrete or distributed components and/or in conjunction with other components. For example, the input shaft 110, static ring 120, orbiter body 130, and the output shaft 150 may be formed as single pieces, or they may be comprised of distinct portions coupled or integral with one another (e.g., the input shaft 110 could be made integral with the orbiter body 130). Further, they may be arranged in any appropriate combination and/or location. Any appropriate material and manufacturing process for the orbital tensile drive discussed herein is contemplated. By way of non-limiting example, as shown in FIGS. 13(a) and 13(b), the primary structural components may be formed from aluminum, machined bits (FIG. 13(a)), can be formed from polylactic acid via three-dimensional printing (FIG. 13(b)), or any other appropriate manufacturing process (e.g., injection molding).

It is noted that the use of directional terms such as above, below, upper, lower, upward, downward, left, right, front, rear and the like are used in relation to the illustrative embodiments as they are depicted in the figures, the upward or upper direction being toward the top of the corresponding figure and the downward or lower direction being toward the bottom of the corresponding figure. It will be appreciated that such terms not intended to imply any restrictive limitations thereto unless explicitly stated to the contrary. By way of example, depending on how the transmission 100 is oriented, the "front" of the transmission 100 as shown in the figures could be oriented as the top of the transmission 100, the rear of the transmission 100, the left side of the transmission 100, etc.

Figure 17:
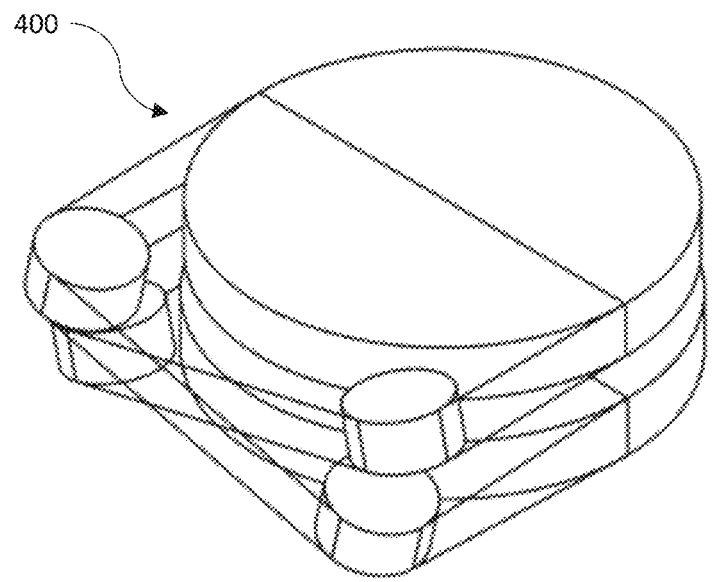
FIG. 17 is a diagrammatic view, similar to FIG. 12, of an alternative idler pulley and tensile element configuration of the orbital tensile drive, according to aspects of the present disclosure.
Figure 18:
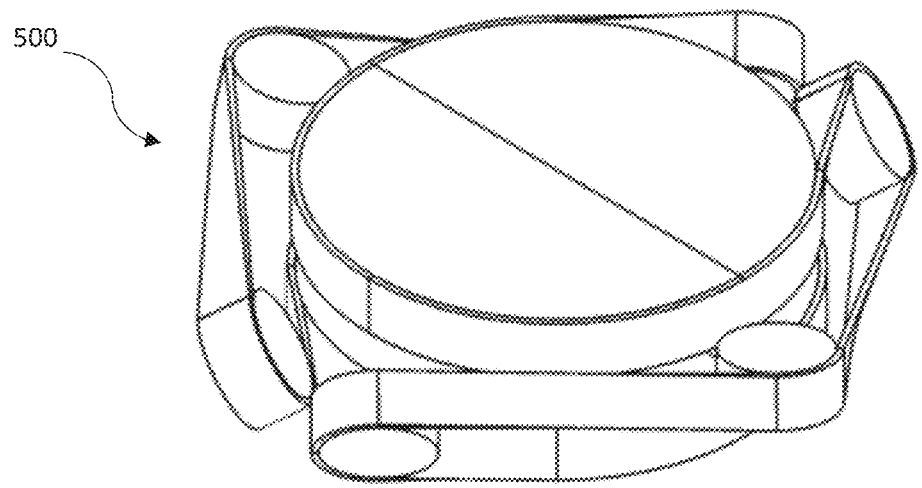
FIG. 18 is a diagrammatic view, similar to FIG. 12, of another alternative idler pulley and tensile element configuration of the orbital tensile drive, according to aspects of the present disclosure.
Figure 19:
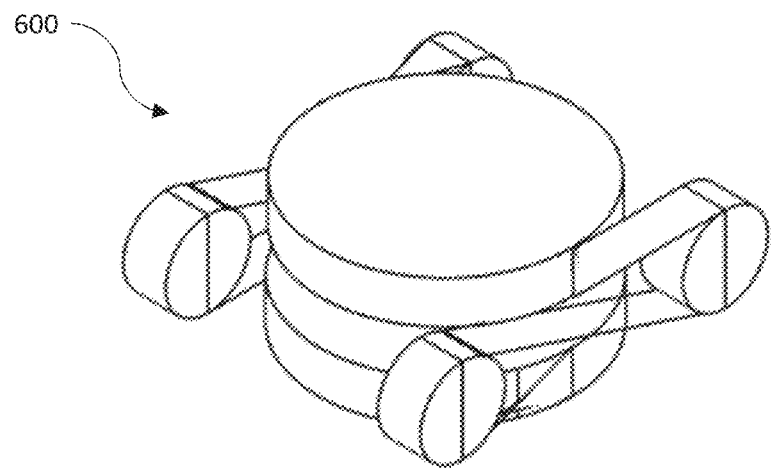
FIG. 19 is a diagrammatic view, similar to FIG. 12, of yet another alternative idler pulley and tensile element configuration of the orbital tensile drive, according to aspects of the present disclosure.
Figure 20:
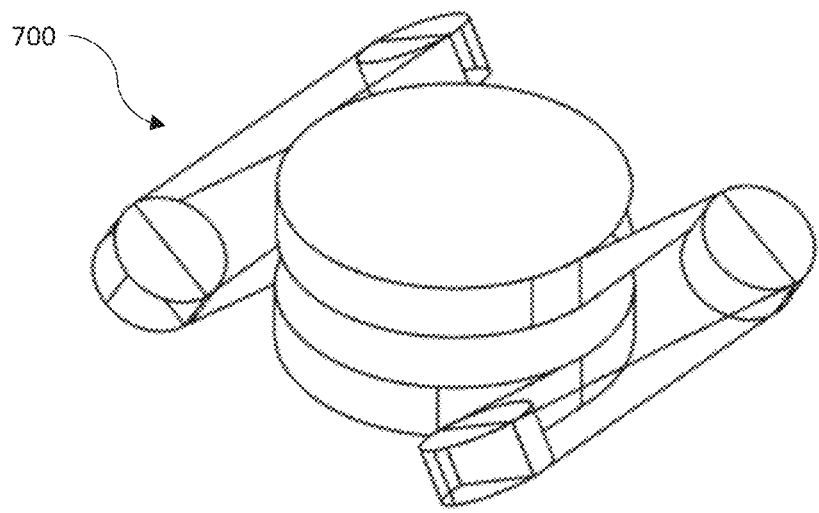
FIG. 20 is a diagrammatic view, similar to FIG. 12, of yet another alternative idler pulley and tensile element configuration of the orbital tensile drive, according to aspects of the present disclosure.

While a preferred embodiment is disclosed, many other implementations will occur to one of ordinary skill in the art and are all within the scope of the invention. For example, as shown in FIG. 17, an alternative idler pulley and tensile element arrangement 400 can be employed that places all the idler pulleys on the same side of the shafts (rather than two on opposing sides). For further example, as shown in FIG. 18, an alternative idler pulley and tensile element arrangement 500 can be employed that utilizes eight idler pulleys positioned around the shafts. For further example, as shown in FIG. 19, an alternative idler pulley and tensile element arrangement 600 can be employed that utilizes positions the idler pulleys perpendicular to the fixed and output shafts. For further example, as shown in FIG. 20, an alternative idler pulley and tensile element arrangement 700 can be employed that is slightly different from the primary embodiment described (FIGS. 1-16), with the tensile element traversing outside of the input/output shafts. This would be desirable where high thinness is desired, trading off with larger diameters.

Each of the various embodiments described above may be combined with other described embodiments in order to provide multiple features. Furthermore, while the foregoing describes a number of separate embodiments of the apparatus and method of the present disclosure, what has been described herein is merely illustrative of the application of the principles of the present disclosure. Other arrangements, methods, modifications, and substitutions by one of ordinary skill in the art are therefore also considered to be within the scope of the present disclosure, which is not to be limited except by the claims that follow.

What is claimed is:

1. An orbital tensile drive comprising:
    a fixed shaft;
    an output shaft;
    an orbiter body that comprises a plurality of idler pulleys, wherein an axis of rotation of each of the plurality of idler pulleys is tilted at an angle relative to a common axis of rotation of the orbiter body; and
    a tensile element movably engaged with the fixed shaft, the output shaft, and the plurality of idler pulleys, wherein the orbiter body is operative to rotate, thereby causing:
        relative rotation between the fixed shaft and the output shaft, and relative rotation between the orbiter body and the output shaft.

2. The orbital tensile drive of claim 1, wherein the fixed shaft comprises a first circumference and the output shaft comprises a second circumference, and wherein the orbiter body comprises an orbiter main member and two laterally disposed orbiter side members, the two orbiter side members extending outwardly beyond the first circumference and the second circumference.

3. The orbital tensile drive of claim 2, wherein at least one of the plurality of idler pulleys is rotatably mounted on one of the two orbiter side members, and at least one of the plurality of idler pulleys is rotatably mounted on the other of the two orbiter side members.

4. The orbital tensile drive of claim 3, wherein the plurality of idler pulleys is four idler pulleys.

5. The orbital tensile drive of claim 1, wherein the fixed shaft comprises a first circumference and the output shaft comprises a second circumference, the second circumference being different from the first circumference, and wherein per each revolution of the orbiter body, the output shaft rotates a difference of the first circumference and the second circumference.

6. The orbital tensile drive of claim 1, wherein the fixed shaft and the output shaft each comprise gear teeth, with the output shaft having fewer gear teeth than the fixed shaft.

7. The orbital tensile drive of claim 6, wherein the tensile element is a timing belt that engages with the gear teeth of the fixed shaft and the gear teeth of the output shaft.

8. The orbital tensile drive of claim 1, further comprising an input shaft operative to rotate the orbiter body, wherein the input shaft is directly coupled to or integral with the orbiter body.

9. An orbital tensile drive comprising:
a fixed shaft;
an output shaft;
an orbiter body, with the fixed shaft, the output shaft and the orbiter body sharing a common axis, and the orbiter body being disposed between the fixed shaft and the output shaft;
a plurality of idler pulleys coupled to the orbiter body, wherein an axis of rotation of each of the plurality of idler pulleys is tilted at an angle relative to the common axis; and
a tensile element movably engaged with the fixed shaft, the output shaft, the plurality of idler pulleys, and the orbiter body, wherein the orbiter body is operative to rotate, thereby causing:
relative rotation between the fixed shaft and the output shaft, and
relative rotation between the orbiter body and the output shaft.

10. The orbital tensile drive of claim 9, wherein a first idler pulley from the plurality of idler pulleys has a first axis of rotation that is different than a second axis of rotation of a second idler pulley from the plurality of idler pulleys.

11. The orbital tensile drive of claim 10, wherein the fixed shaft comprises a first circumference and the output shaft comprises a second circumference, wherein the second circumference is different from the first circumference, and wherein the orbiter body comprises an orbiter main member and two laterally disposed orbiter side members, the two orbiter side members extending outwardly beyond the first circumference and the second circumference.

12. The orbital tensile drive of claim 11, wherein half of the plurality of idler pulleys are rotatably mounted on one of the two orbiter side members, and the other half of the plurality of idler pulleys are rotatably mounted on the other of the two orbiter side members.

13. The orbital tensile drive of claim 10, wherein the plurality of idler pulleys is four idler pulleys.

14. The orbital tensile drive of claim 9, wherein the fixed shaft and the output shaft each comprise gear teeth, with the output shaft having fewer gear teeth than the fixed shaft, and wherein the tensile element is a timing belt that engages with the gear teeth of the fixed shaft and the gear teeth of the output shaft.

15. The orbital tensile drive of claim 9, further comprising an input shaft operative to rotate the orbiter body.

16. The orbital tensile drive of claim 15, wherein the input shaft is directly coupled to or integral with the orbiter body.

17. The orbital tensile drive of claim 15, wherein the input shaft extends through the fixed shaft.

18. The orbital tensile drive of claim 9, wherein the tensile element is one of a timing belt, a flat belt, a v-belt, a rope, a chain, or a cable.

19. A system comprising:
an orbital tensile drive comprising:
a fixed shaft,
an output shaft,
an orbiter body, with the fixed shaft, the output shaft, and the orbiter body sharing a common axis, and the orbiter body being disposed between the fixed shaft and the output shaft,
a plurality of idler pulleys coupled to the orbiter body, wherein an axis of rotation of each of the plurality of idler pulleys is tilted at an angle relative to the common axis, and
a tensile element movably engaged with the fixed shaft, the output shaft, the plurality of idler pulleys, and the orbiter body, wherein the orbiter body is operative to rotate, thereby causing:
relative rotation between the fixed shaft and the output shaft, and
relative rotation between the orbiter body and the output shaft;
an input operative to rotate the orbiter body at a first speed; and
a driven member driven to rotate by the output shaft at a second speed that is less than the first speed.

20. The system of claim 19, wherein the input is an electric motor.

* * * * *